D. S. LISTON.
ANIMAL TRAP.
APPLICATION FILED JAN. 25, 1915.
1,182,495.
Patented May 9, 1916.
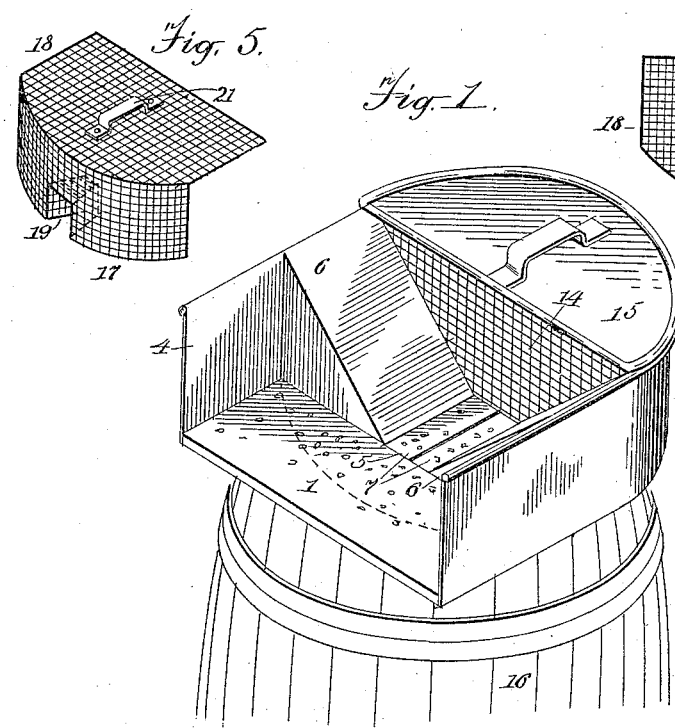
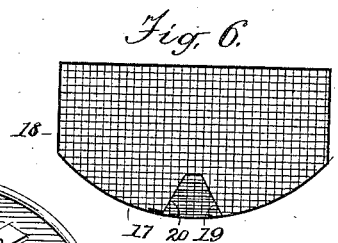
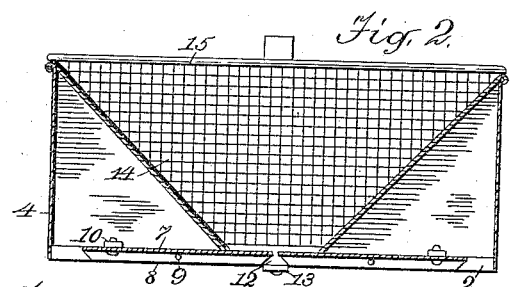
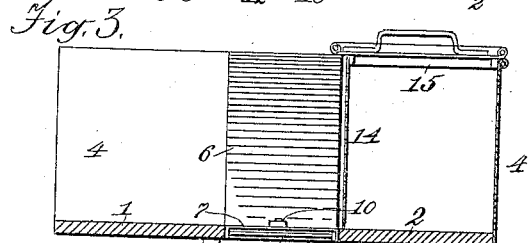
Witnesses
Geo. P. Carpenter
Mary Dunlap
Inventor
Daniel S. Liston
By J. M. St. John
Atty.
THE COLUMBIA PLANOGRAPH CO., WASHINGTON, D. C.

UNITED STATES PATENT OFFICE.

DANIEL S. LISTON, OF ELBERON, IOWA.

ANIMAL-TRAP.

1,182,495.  Specification of Letters Patent.  Patented May 9, 1916.

Application filed January 25, 1915. Serial No. 4,410.

*To all whom it may concern:*

Be it known that I, DANIEL S. LISTON, a citizen of the United States, residing at Elberon, in the county of Tama and State of Iowa, have invented certain new and useful Improvements in Animal-Traps; and I do hereby declare the following to be a full, clear, and exact description of the invention, such as will enable others skilled in the art to which it appertains to make and use the same.

The object of this invention is to produce a self-acting trap adapted to catch a large number of animal pests, by means calculated to create little suspicion or fear on the part of others near those so caught.

In the accompanying drawing, forming a part of this specification, Figure 1 is a view in perspective of a trap embodying my invention, as arranged for both live and food bait. Fig. 2 is a central cross section of the same. Fig. 3 is a central longitudinal section of the same. Fig. 4 is the trap-door cleat. Fig. 5 is a view in perspective of an attachment to the trap to be used in catching English sparrows. Fig. 6 is a plan view of the same, as seen from the under side.

Referring to the drawing, the invention is briefly described as follows:

A platform 1 and 2 is provided on all but one side with a wall 4, preferably of sheet-metal. About midway of the inclosure so formed, and separating the two parts of the platform, is a gap 5. Except for a short space in the middle this gap is covered by a pair of inclines 6, which should be of metal, or other smooth material which will not allow an animal a foothold on the inclines, which, as will be seen, face each other. In the gap are poised two trap-doors 7. In practice these are made of sheet metal, with side flanges 8 pierced near the middle to receive a wire or rod 9 extending across the gap. The flanges not only serve as pivot-bearings, but present to the adjacent sides of the gap comparatively broad, smooth surfaces, and prevent any possibility of obstruction in the operation of the trap-doors by catching on the adjacent parts. The trap-doors are held normally in horizontal position, and in contact with the bottom edges of the inclines, by light counterweights 10, those shown being short stove-bolts. The poise of the trap-doors is so delicate that the weight of a small mouse will tip them instantly, and as soon as relieved of the weight they return to normal position. Provision is made for fastening the trap-doors in normal position, for a purpose which will presently be explained. This may be a cleat 11 as long almost as the width of the gap, and fitting into the angle shown in Fig. 1 at 12. The cleat is fastened in position by turn-buttons 13. Behind the inclines is an inclosure whose floor is a continuation of the platform, and may be used in the same way and for the same purpose, that is to say, to receive scattered food, all parts of the platform being open and accessible. It is sometimes desirable, however, to use the rear inclosure for live bait, a brood of chickens, with or without the mother hen, for example. In this case this part of the trap is shut off from the rest by a screen 14 attached to a cover 15 suitably fitting this inclosure. This may be put in place, or removed at pleasure. In cold weather it is of course removed, and food-bait used instead. But in the summer a brood of small chickens forms a most enticing bait for rats, weasels, and other destructive animals, and the screened inclosure is then a very useful accessory.

The trap so described is put in operative position by setting it on the top of an open barrel 16, or other suitable receptacle, and this, in warm weather, may be partially filled with water, if desired, so that the animals as caught are drowned at once.

The device, as will be seen, is very simple, but is designed to circumvent the proverbial cunning and suspicion of noxious animal pests, and more particularly the common gray rat. The aim has been to first completely disarm suspicion. One means to this end is the avoidance in the construction of the trap, of narrow passage-ways of any considerable length. These, experience has shown, tend to defeat the object of the trap, which is to take the animal unawares, and drop him out of sight in a moment. In the course of extended experiments the trap was made with the inclined parts extending clear to the front, and notwithstanding the utmost care and skill on the part of the operator not a rat was caught. The trap was finally constructed in its present form, the narrow space being limited to the trap-doors, and a front platform provided extending each side of the narrow space. This wide platform not only gives a broad feeding ground, but a place where a considerable group of the animals may gather, smell, look and run the situation over, play about, communicate with each other, eat the bait, and finally, by accident or otherwise, get their forepaws on the trap-doors, and down the animal goes in an instant. The practical effect of this simple change in structure is indicated by the fact that when set under the same conditions as in the case of the former structure, the first night's catch was twenty eight rats, not counting a few that got away when the trap was lifted off the barrel.

It is to be noted in this connection that a rat when traveling usually runs, but when undisturbed and feeding or playing he hops about. The trap takes advantage of this hopping action. If he were running, and got one paw on the yielding trap, he might draw back and escape, but if he lands both front paws on the trap doors, or either of them, he cannot retrieve himself, and goes through so suddenly and noiselessly that he is not even missed by his companions.

In the practical use of the trap the device for locking the trap-doors in normal position is also quite important. At first the whole affair is under suspicion. To disarm this suspicion the whole affair is for a time made perfectly safe, the trap-doors being locked so they will not even yield when stepped or jumped upon. This is continued for a number of days and nights, bait being generously strewed over the platform and some on the trap-doors themselves. The animals thus come to be familiar with the device, and run all over it, leaving their tracks and scent on the trap-doors as well as other parts. When this familiarity has become well established, the operator carefully removes the trap-door lock, with as little handling as possible, places the trap as before, strews bait, all about, a little on the trap-doors themselves—and is likely to find a half bushel of rats in the barrel in the morning.

In Figs. 5 and 6 is shown an attachment whereby the trap is adapted to the catching of English sparrows, which in some sections are a great pest. This consists of a screen somewhat similar to the one for the rear compartment, but preferably provided with a curved front 17 and a flat top 18 to rest on the inclines 6. When in operative position the front rests on the front platform 1, as indicated by the dotted lines. At the bottom is a small doorway formed by clipping the screen on two sides and bending the part 19 inwardly. A similar piece 20 is attached at the other side of the opening, both connected by a covering screen and the inward ends of the parts converge to a space but little wider than the body of the bird, so that once inside, or even part way through the opening it is practically impossible for him to retreat. While moving about inside the cage so formed he is sure to encounter the trap-doors sooner or later, and drop through into the barrel. The attachment is easily lifted out of place when not wanted for birds, and may have a handle 21 or not, as desired.

Having thus described my invention, I claim:

An animal trap, comprising an inclosure having one wide open side, a platform corresponding to the open space, a pair of inclines extending from the top to the bottom of the inclosure and separated by a narrow passageway, a gap in said passageway, trap-doors pivoted back of the lower edges of the inclines, and held from uptilting thereby, a locking-bar or cleat and means for fastening the same, to lock the trap temporarily, a rear inclosure with a removable front and top, and an auxiliary, removable front and top for the open platform, with an inwardly converging opening therein.

In testimony whereof I affix my signature in presence of two witnesses.

DANIEL S. LISTON.

Witnesses:
FRANK M. ADAMS,
A. T. COOPER.